United States Patent [19]

Okada et al.

[11] Patent Number: 5,285,303
[45] Date of Patent: Feb. 8, 1994

[54] PHASE RETARDER AND PROCESS FOR PRODUCING THE SAME

[75] Inventors: Toyokazu Okada; Kazuaki Sakakura; Koji Higashi; Akiko Shimizu, all of Osaka, Japan

[73] Assignee: Sumitomo Chemical Co., Ltd., Osaka, Japan

[21] Appl. No.: 705,203

[22] Filed: May 24, 1991

[30] Foreign Application Priority Data

May 25, 1990 [JP] Japan .................. 2-135830

[51] Int. Cl.$^5$ .......................... G02B 1/04; G02B 5/30
[52] U.S. Cl. ...................... 359/73; 359/490; 359/500
[58] Field of Search ............... 359/73, 494, 500, 490, 359/491, 492; 252/586, 582

[56] References Cited

U.S. PATENT DOCUMENTS

| | | |
|---|---|---|
| 3,447,857 | 6/1969 | McCartney .................. 359/500 |
| 3,614,195 | 10/1971 | Vollmer ...................... 359/500 |
| 5,018,839 | 5/1991 | Yamamoto et al. .......... 359/73 |
| 5,042,924 | 8/1991 | Terasaki et al. ............. 359/494 |
| 5,061,042 | 10/1991 | Nakamura et al. .......... 359/73 |

FOREIGN PATENT DOCUMENTS 0297841 1/0489 European Pat. Off. ...... G02B 27/28

OTHER PUBLICATIONS

Patent Abstracts of Japan, vol. 9, No. 334 (P-147) (2057) Dec. 27, 1985 & JP-A-60 159 704.
Patent Abstracts of Japan, vol. 1, No. 211 (M-501) Jul. 24, 1986 & JP-A-61 051 323.

Primary Examiner—Martin Lerner
Attorney, Agent, or Firm—Sughrue, Mion, Zinn, Macpeak & Seas

[57] ABSTRACT

A phase retarder and a process for producing the same are disclosed. The phase retarder is obtained by shrinking a uniaxially stretched thermoplastic high polymer film in the direction perpendicular to the stretching direction at a lengthwise shrink of at least 2%. The phase retarder has a ratio of a retardation value ($R_{30}$) measured on the phase retarder being inclined at a angle of 30° with respect to the orientation axis as an axis of rotation to a retardation value ($R_0$) measured on the phase retarder being held horizontally, each measured with a polarizing microscope, ($R_{30}/R_0$) of not more than 1.10, and preferably not more than 1.07. A liquid crystal display fitted with the phase retarder exhibits broad viewing angle characteristics while achieving a satisfactory B/W display level.

3 Claims, 3 Drawing Sheets

STRETCH

STRETCHING AXIS

PHASE RETARDER AND PROCESS FOR PRODUCING THE SAME

FIELD OF THE INVENTION

The present invention relates to a novel phase retarder for use in liquid crystal displays, etc. and a process for producing the same.

BACKGROUND OF THE INVENTION

A phase retarder comprising a uniaxially oriented high polymer film has been used in liquid crystal displays and chiefly in an STN type liquid crystal display in which nematic liquid crystal molecules are twisted at an angle of 180° or more as an optical compensator for improving display quality.

Liquid crystal displays using conventional phase retarders, although providing a relatively satisfactory black-and-white display (hereinafter referred to as "B/W display"), have a disadvantage of a narrow viewing angle.

SUMMARY OF THE INVENTION

An object of the present invention is to provide a phase retarder suitable for use in liquid crystal displays, which has uniformity with no optical unevenness and broad viewing angle characteristics while achieving a satisfactory B/W display.

The present invention provides a phase retarder obtained by shrinking a uniaxially stretched thermoplastic high polymer film in the direction perpendicular to the stretching direction at a lengthwise shrink of at least 2%, the phase retarder having a ratio of a retardation value ($R_{30}$) measured on the phase retarder being inclined at a angle of 30° with respect to the orientation axis as an axis of rotation to a retardation value ($R_0$) measured on the phase retarder being held horizontally, each measured with a polarizing microscope, ($R_{30}/R_0$) of not more than 1.10, and preferably not more than 1.07.

The present invention also provides a process for producing a phase retarder comprising the step of: heat treating a uniaxially stretched thermoplastic high polymer film with its stretching axis being fixed to shrink the film in the direction perpendicular to the stretching axis at a lengthwise shrink of at least 2%.

Figure 5:
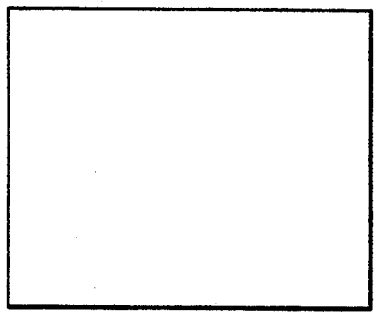
FIG. 5 shows an unstretched film.
Figure 5:
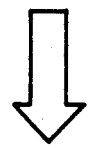
Figure 6:
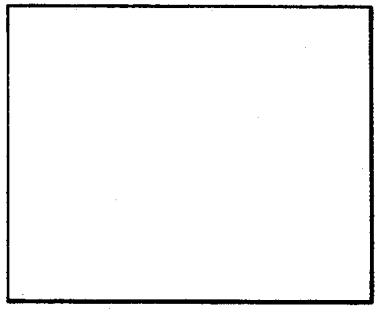
FIG. 6 shows uniaxial stretching.
Figure 6:
Figure 7:
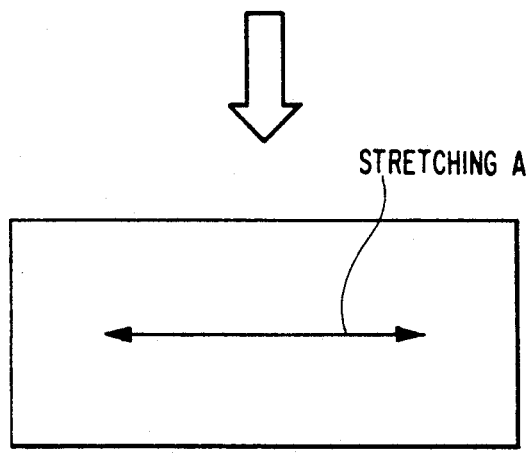
FIG. 7 shows a uniaxially stretched film.
Figure 7:
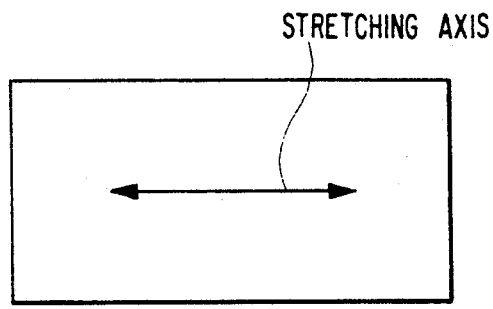
Figure 8:
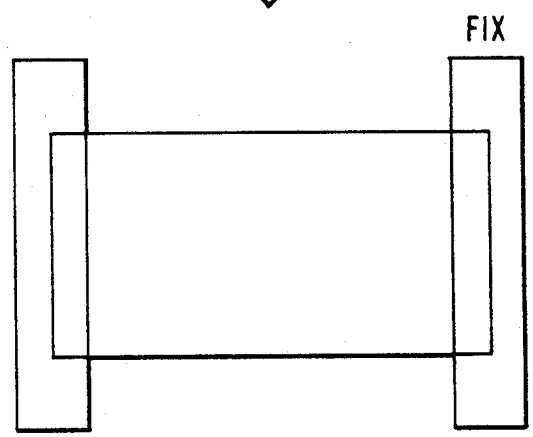
FIG. 8 shows the state in which the stretching axis of the film is fixed.
Figure 9:
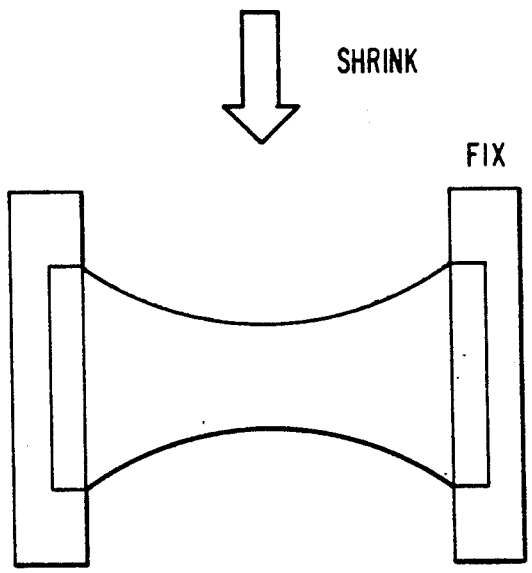
FIG. 9 shows the state in which the film is shrunk in the direction perpendicular to the stretching direction.

Briefly, an unstretched film (FIG. 5) is uniaxially stretched as shown in FIG. 6. The relationship of the stretching direction and the position to be fixed in the shrinking of the stretched film (FIG. 7) is shown in FIG. 8. When the stretched film is heated, the film suffers the force of shrinking in the stretched direction. However, because the film is fixed as shown in FIG. 8, it cannot shrink in the stretched direction and shrinks in the direction shown in FIG. 9. A film of high uniaxial orientation can be obtained by these stretching and shrinking steps.

DESCRIPTION OF THE INVENTION

One of the important requirements for phase retarders to be used as an optical compensator of STN type liquid crystal displays lies in that optical characteristics of a phase retarder should conform to those of a liquid crystal cell. The retardation value of a phase retarder for STN type liquid crystal displays is generally selected from a range of from 100 to 1,000 nm, and preferably of from 200 to 800 nm, though varying depending on the type of the STN type liquid crystal cell and the number of phase retarders used.

The terminology "viewing angle characteristics" as used for liquid crystal displays means a degree of change from display characteristics when a display is seen from its front to those when it is seen at a different angle. The greater the change, the narrower the viewing angle; and the smaller the change, the broader the viewing angle. Display characteristics of liquid crystal displays are improved with an increase in viewing angle.

In order to solve the above-described problem that a phase retarder composed of a high polymer film has a narrow viewing angle, although capable of achieving a relatively satisfactory B/W display, the present inventors made measurements of viewing angle of a liquid crystal display fitted with various phase retarders having different uniaxial orientation properties. As a result, it was found that a film having higher uniaxial orientation has a broader viewing angle while a film of lower uniaxial orientation, such as a biaxially oriented film, has a narrower viewing angle.

Based on this result, conventional phase retarders made of high polymer films were re-considered. The conventional phase retarders composed of a uniaxially oriented high polymer film are obtained by moderately stretching a film or sheet prepared by a known film formation method, such as extrusion and solvent casting, in one direction by a known stretching technique, such as stretching between rolls, rolling, and tentering. When the film or sheet is uniaxially stretched, orientation also takes place in the direction perpendicular to the stretching direction due to an internal stress so that the resulting stretched film has reduced uniaxial orientation properties and a reduced viewing angle. In particular, a stretched film obtained by transverse uniaxial stretching by tentering, which is deemed preferable for its optical uniformity because no neck-in takes place in the direction perpendicular to the stretching direction, was proved to have considerable orientation in the direction perpendicular to the stretching direction due to an internal stress and, therefore, to have reduced uniaxial orientation properties and reduced viewing angle characteristics.

Hence, the present inventors have conducted extensive studies on a possibility of relaxing the orientation in the direction perpendicular to the stretching direction so as to improve uniaxial orientation in the stretching direction. As a result, it has now been found that a uniaxially stretched film is subjected to heat treatment to shrink in the direction perpendicular to the stretching direction at a lengthwise shrink of at least 2%, preferably at least 5%, and more preferably at least 10%, to thereby provide a phase retarder having excellent viewing angle characteristics owing to the thus improved uniaxial orientation.

A lengthwise shrink in the direction perpendicular to the stretching direction of 30% or more is not preferred because shrinkage becomes uneven, failing to obtain optical uniformity although the viewing angle may further be broadened.

Figure 1:
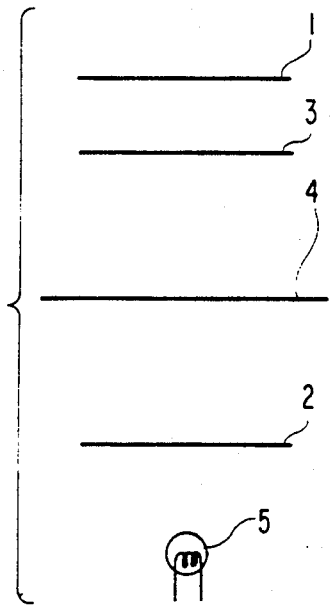
FIGS. 1 and 2 are plan views schematically showing the relationship of the arrangements of the elements used to measure the retardation values $R_0$ and $R_{30}$, respectively, with a polarizing microscope.
Figure 2:
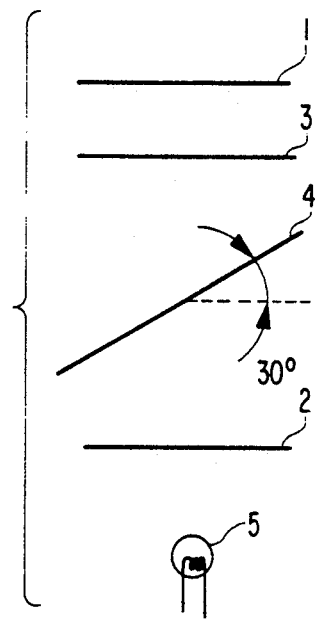
Figure 3:
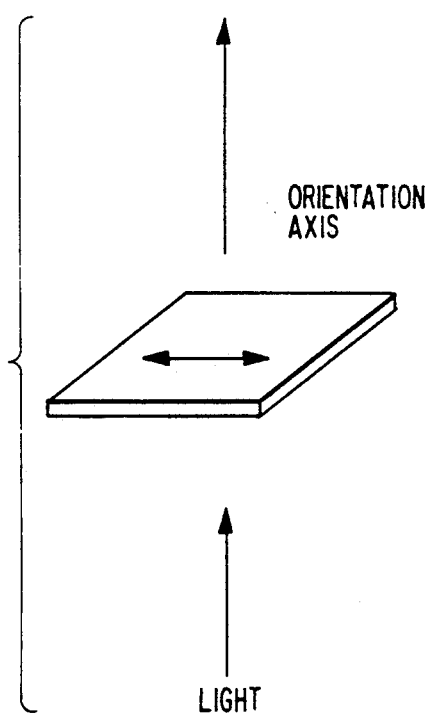
FIGS 3 and 4 are plan views schematically showing the inclination angle of the phase retarder with respect to the orientation axis for measurement of the retardation values $R_0$ and $R_{30}$, corresponding to FIGS. 1 and 2, respectively.
Figure 4:
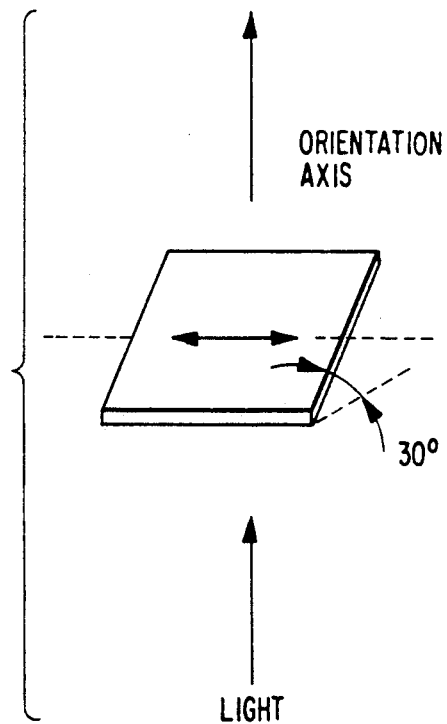

As shown in FIGS. 1 and 2, viewing angle characteristics of phase retarders 4 and 7 can be quantitatively determined by observing a light source 5 using a polarizing microscope 1 equipped with a Senarmont compensator 3 and a polarizar 2 to obtain an $R_{30}/R_0$ ratio. As shown in FIGS. 3 and 4 $R_0$ is a retardation value measured on the phase retarder 4 inclined at an angle of 0° with respect to an orientation axis as a rotation axis, and $R_{30}$ is a retardation value measured on the phase retarder 4 inclined at 30° on the orientation axis as a rotation axis. The smaller the $R_{30}/R_0$ ratio of a phase retarder, i.e., the degree of change in display characteristics, the broader the viewing angle of a liquid crystal display fitted with such a phase retarder.

Examples of thermoplastic high polymers which can be used in the present invention include polycarbonate resins; poly(meth)acrylate resins, such as polymethyl methacrylate and methyl (meth)acrylate copolymers comprising methyl (meth)acrylate as a major component and other ethylenically unsaturated comonomer(s); polystyrene resins, such as polystyrene and styrene copolymers comprising styrene as a major component and other ethylenically unsaturated comonomer(s); acrylonitrile resins, such as polyacrylonitrile and acrylonitrile copolymers; polyester resins, such as polyethylene terephthalate and copolyesters; polyamide resins, such as nylon 6 and nylon 66; polyvinyl chloride resins, such as polyvinyl chloride and vinyl chloride copolymers; polyolefin resins, such as polyethylene, polypropylene, ethylene copolymers, and propylene copolymers; polysulfone; polyether sulfone; polyarylate resins; fluorine resins; cellulose resins; modified resins of these resins; and blends of these resins with high-molecular liquid crystals, transparent low-molecular compounds such as low-molecular liquid crystals, or transparent inorganic compounds. Preferred of them are polycarbonate resins, polyester resins, e.g., polyethylene terephthalate, polysulfone, polyether sulfone, polyarylate, and styrene resins comprising styrene as a major component and other ethylenically unsaturated comonomer(s). The term "(meth)acrylate" used herein means "acrylate or methacrylate".

The uniaxially stretched high polymer films can be obtained by uniaxially stretching a film or sheet comprising at least one of the above-mentioned materials by any of known techniques such as stretching between rolls, stretching by tentering, or compression stretching between rolls.

Shrinking of the stretched film in the direction perpendicular to the stretching direction can be carried out by subjecting the stretched film to heat treatment in a temperature near the stretching temperature with the stretching axis of the film being fixed while the direction perpendicular to the stretching direction being slackened.

The above-described heat treatment to allow the stretched film to arbitrarily shrink with its stretching axis being fixed is effective to control retardation. If both ends of the stretching axis are not fixed, shrinkage in the perpendicular direction becomes non-uniform, resulting in the failure of obtaining a film having uniform retardation.

The lengthwise shrink in the direction perpendicular to the stretching direction can be arbitrarily adjusted by controlling the degree of film slackening, the heat treating temperature, and shrink characteristics in the stretching direction. In general, as the lengthwise shrink in the direction perpendicular to the stretching direction becomes greater, the orientation in that direction is relieved to increase the uniaxial orientation in the stretching direction to provide a phase retarder having excellent viewing angle characteristics.

The heat treatment of the stretched film can be carried out by means of, for example, a tenter for heat treatment in which a chucking mechanism and a film feeding mechanism are so devised to provide a mechanism of shrinking in the direction perpendicular to the stretching direction or a machine for shrinkproof finish utilizing a difference in peripheral speed of a roll, a belt, etc.

In the present invention, a stretched film obtained by transverse uniaxial stretching by tentering is particularly preferred as a uniaxially oriented thermoplastic high polymer film for providing a phase retarder having excellent optical uniformity and viewing angle characteristics.

The phase retarder of the present invention, when used as an optical compensator in an STN type liquid crystal display, not only accomplishes a satisfactory B/W display but also broadens a viewing angle to improve viewing angle characteristics to thereby provide an STN liquid crystal display with markedly improved display characteristics.

The present invention is now illustrated in greater detail with reference to the following Examples, but it should be understood that the present invention is not deemed to be limited thereto.

In Examples, retardation values ($R_0$, $R_{30}$) of phase retarders obtained were measured by use of a polarizing microscope.

In Examples, the viewing angle characteristics were evaluated in such a manner that the case where the viewing angle was ±25° or more was called broad viewing angle characteristics, and the case where the viewing angle was less than ±25° was called narrow viewing angle characteristics. The viewing angle was measured in such a manner that the range in which the contrast ratio was 3 or more was evaluated as the viewing angle. The contrast ratio was the luminance ratio of the display surface upon applying the voltage to that not applying the voltage.

EXAMPLE 1

A transparent polycarbonate film of 200 μm in thickness and 500 mm in width was subjected to transverse uniaxial stretching by tentering at a temperature of 180° C. to obtain a uniaxially stretched film having a thickness of 80 μm and a width of 1,250 mm.

The stretched film was set in a tenter for heat treatment equipped with a mechanism for shrinking a film in its longitudinal direction, and the stretched film was allowed to shrink at a temperature for 170° C. in the direction perpendicular to the stretching direction at a shrink of 15% to obtain a film having a thickness of 94 μm and a width of 1,250 mm.

The resulting film proved to be a phase retarder of uniform quality having an $R_0$ value of 590 nm and an $R_{30}$ value of 619 nm, i.e., an $R_{30}/R_0$ ratio of 1.05.

An STN type liquid crystal display fitted with the phase retarder proved to achieve a satisfactory B/W display level free from unevenness and broad viewing angle characteristics.

EXAMPLE 2

A phase retarder was produced in the same manner as in Example 1, except that the stretched film was shrunk at a temperature of 170° C. at a shrink of 10% in the stretching direction and 10% in the direction perpendicular to the stretching direction to obtain a film having a thickness of 100 μm and a width of 1,125 mm.

The resulting phase retarder had uniform quality having an $R_0$ value of 575 nm and an $R_{30}$ value of 615 nm, i.e., an $R_{30}/R_0$ ratio of 1.07.

An STN type liquid crystal display fitted with the phase retarder proved to achieve a satisfactory B/W display level free from unevenness and broad viewing angle characteristics.

EXAMPLE 3

A transparent polycarbonate film of 100 μm in thickness and 500 mm in width was subjected to transverse uniaxial stretching by tentering at a temperature of 170° C. to obtain a uniaxially stretched film having a thickness of 50 μm and a width of 1,000 mm.

The stretched film was shrunken by means of the same machine as used in Example 1 at a temperature for 160° C. at a shrink of 10% in the stretching direction and 12% in the direction perpendicular to the stretching direction to obtain a film having a thickness of 63 μm and a width of 900 mm.

The resulting film proved to be a phase retarder of uniform quality having an $R_0$ value of 320 nm and an $R_{30}$ value of 340 nm, i.e., an $R_{30}/R_0$ ratio of 1.06.

An STN type liquid crystal display fitted with the phase retarder proved to achieve a satisfactory B/W display level free from unevenness and broad viewing angle characteristics.

EXAMPLE 4

A phase retarder was produced in the same manner as in Example 3, except that the stretched film was shrunk at a temperature of 165° C. at a shrink of 10% in the stretching direction and 5% in the direction perpendicular to the stretching direction to obtain a film having a thickness of 58 μm and a width of 900 mm.

The resulting phase retarder had uniform quality having an $R_0$ value of 380 nm and an $R_{30}$ value of 415 nm, i.e., an $R_{30}/R_0$ ratio of 1.09.

An STN type liquid crystal display fitted with the phase retarder proved to achieve a satisfactory B/W display level free from unevenness and broad viewing angle characteristics.

EXAMPLE 5

A cellulose diacetate film of 250 μm in thickness and 500 mm in width was subjected to transverse uniaxial stretching by tentering at a temperature of 195° C. to obtain a uniaxially stretched film having a thickness of 125 μm and a width of 1,000 mm.

The stretched film was shrunk by means of the same machine as used in Example 1 at a temperature for 180° C. at a shrink of 20% in the stretching direction and 10% in the direction perpendicular to the stretching direction to obtain a film having a thickness of 170 μm and a width of 800 mm.

The resulting film proved to be a phase retarder of uniform quality having an $R_0$ value of 200 nm and an $R_{30}$ value of 215 nm, i.e., an $R_{30}/R_0$ ratio of 1.07.

An STN type liquid crystal display fitted with the phase retarder proved to achieve a satisfactory B/W display level free from unevenness and broad viewing angle characteristics.

COMPARATIVE EXAMPLE 1

A transparent polycarbonate film of 200 μm in thickness and 500 mm in width was subjected to transverse uniaxial stretching by tentering at a temperature of 180° C. to obtain a uniaxially stretched film having a thickness of 80 μm and a width of 1,250 mm.

The resulting stretched film proved to be a phase retarder of uniform quality having an $R_0$ value of 600 nm and an $R_{30}$ value of 680 nm, i.e., an $R_{30}/R_0$ ratio of 1.13.

An STN type liquid crystal display fitted with the phase retarder proved to have a satisfactory B/W display level free from unevenness but narrow viewing angle characteristics.

COMPARATIVE EXAMPLE 2

A transparent polycarbonate film of 100 μm in thickness and 500 mm in width was subjected to transverse uniaxial stretching by tentering at a temperature of 170° C. to obtain a uniaxially stretched film having a thickness of 50 μm and a width of 1,000 mm.

The resulting stretched film proved to be a phase retarder of uniform quality having an $R_0$ value of 400 nm and an $R_{30}$ value of 460 nm, i.e., an $R_{30}/R_0$ ratio of 1.15.

When an STN type liquid crystal display was fitted with the phase retarder, a satisfactory B/W level free from unevenness was obtained, but the viewing angle characteristics were narrow.

EXAMPLE 6

A polysulfone film of 200 μm in thickness and 500 mm in width was subjected to transverse uniaxial stretching by tentering at a temperature of 210° C. to obtain a uniaxial stretched film having a thickness of 120 μm and a width of 850 mm.

The stretched film was shrunk by means of the same machine as used in Example 1 at a temperature for 200° C. at a shrink of 5% in the stretching direction and 10% in the direction perpendicular to the stretching direction to obtain a film having a thickness of 140 μm and a width of 820 mm.

The resulting film proved to be a phase retarder of uniform quality having an $R_0$ value of 360 nm and an $R_{30}$ value of 390 nm, i.e., an $R_{30}/R_0$ ratio of 1.07.

An STN type liquid crystal display fitted with the phase retarder proved to achieve a satisfactory B/W display level free from unevenness and broad viewing angle characteristics.

EXAMPLE 7

A polyarylate film of 200 μm in thickness and 500 mm in width was subjected to transverse uniaxial stretching by tentering at a temperature of 225° C. to obtain a uniaxially stretched film having a thickness of 130 μm and a width of 750 mm.

The stretched film was shrunk by means of the same machine as used in Example 1 at a temperature for 210°

C. at a shrink of 8% in the direction perpendicular to the stretching direction to obtain a film having a thickness of 140 μm and a width of 750 mm.

The resulting film proved to be a phase retarder of uniform quality having an $R_0$ value of 400 nm and an $R_{30}$ value of 435 nm, i.e., an $R_{30}/R_0$ ratio of 1.07.

An STN type liquid crystal display fitted with the phase retarder proved to achieve a satisfactory B/W display level free from unevenness and broad viewing angle characteristics.

EXAMPLE 8

A polyether sulfone film of 200 μm in thickness and 500 mm in width was subjected to transverse uniaxial stretching by tentering at a temperature of 245° C. to obtain a uniaxially stretched film having a thickness of 125 μm and a width of 820 mm.

The stretched film was shrunk by means of the same machine as used in Example 1 at a temperature for 225° C. at a shrink of 7% in the stretching direction and 8% in the direction perpendicular to the stretching direction to obtain a film having a thickness of 140 μm and a width of 800 mm.

The resulting film proved to be a phase retarder of uniform quality having an $R_0$ value of 555 nm and an $R_{30}$ value of 590 nm, i.e., an $R_{30}/R_0$ ratio of 1.06.

An STN type liquid crystal display fitted with the phase retarder proved to achieve a satisfactory B/W display level free from unevenness and broad viewing angle characteristics.

COMPARATIVE EXAMPLE 3

A polysulfone film of 200 μm in thickness and 500 mm in width was subjected to transverse uniaxial stretching by tentering at a temperature of 210° C. to obtain a uniaxially stretched film having a thickness of 120 μm and a width of 850 mm.

The resulting stretched film proved to be a phase retarder of uniform quality having an $R_0$ value of 450 nm and an $R_{30}$ value of 510 nm, i.e., an $R_{30}/R_0$ ratio of 1.13.

When an STN type liquid crystal display was fitted with the phase retarder, the display exhibited a satisfactory B/W level free from unevenness but narrow viewing angle characteristics.

COMPARATIVE EXAMPLE 4

A polyarylate film of 200 μm in thickness and 500 mm in width was subjected to transverse uniaxial stretching by tentering at a temperature of 225° C. to obtain a uniaxial stretched film having a thickness of 130 μm and a width of 750 mm.

The resulting stretched film proved to be a phase retarder of uniform quality having an $R_0$ value of 520 nm and an $R_{30}$ value of 585 nm, i.e., an $R_{30}/R_0$ ratio of 1.15.

When an STN type liquid crystal display was fitted with the phase retarder, the display exhibited a satisfactory B/W level free from unevenness but narrow viewing angle characteristics.

COMPARATIVE EXAMPLE 5

A polyether sulfone film of 200 μm in thickness and 500 mm in width was subjected to transverse uniaxial stretching by tentering at a temperature of 245° C. to obtain a uniaxially stretched film having a thickness of 125 μm and a width of 820 mm.

The resulting stretched film proved to be a phase retarder of uniform quality having an $R_0$ value of 585 nm and an $R_{30}$ value of 665 nm, i.e., an $R_{30}/R_0$ ratio of 1.14.

When an STN type liquid crystal display was fitted with the phase retarder, the display exhibited a satisfactory B/W level free from unevenness but narrow viewing angle characteristics.

While the invention has been described in detail and with reference to specific examples thereof, it will be apparent to one skilled in the art that various changes and modifications can be made therein without departing from the spirit and scope thereof.

What is claimed is:

1. A phase retarder obtained by shrinking a uniaxially stretched thermoplastic high polymer film in the direction perpendicular to the stretching direction at a lengthwise shrink of at least 2%, said phase retarder having a ratio of a retardation value $R_{30}$ measured with the phase retarder inclined at an angle of 30° with respect to the orientation axis as an axis of rotation, to a retardation value $R_0$ measured with the phase retarder inclined at an angle of 0° with respect to the orientation axis, $R_{30}/R_0$, of not more than 1.10, wherein the thermoplastic high polymer film comprises at least one member selected from the group consisting of a polycarbonate resin, a polysulfone, a polyether sulfone, a polyarylate resin, a polystyrene resin, and a cellulose resin, and wherein said retardation values $R_{30}$ and $R_0$ are each measured with a polarizing microscope.

2. A phase retarder as claimed in claim 1, wherein said uniaxially stretched thermoplastic high polymer film is a film obtained by transverse uniaxial stretching by tentering.

3. A phase retarder as claimed in claim 1, wherein the ratio $R_{30}/R_0$ is not more than 1.07.

* * * * *